United States Patent [19]
Stotlar

[11] 3,887,471
[45] June 3, 1975

[54] TRANSMITTING POWER METER FOR MEASUREMENT OF RADIATION

[75] Inventor: Suzanne C. Stotlar, Garretsville, Ohio

[73] Assignee: Kewanee Oil Company, Bryn Mawr, Pa.

[22] Filed: Feb. 19, 1974

[21] Appl. No.: 443,345

[52] U.S. Cl. .................................. 250/338; 250/340
[51] Int. Cl. ............................................. G01t 1/16
[58] Field of Search ........... 250/338, 339, 340, 351, 250/352, 353, 372, 252; 73/355 R, 355 EM, 190 R, 190 H; 324/95, 96

[56] References Cited
UNITED STATES PATENTS
3,487,685  1/1970  Shifrin ............................. 73/190 A
3,571,592  3/1971  Glass .................................. 250/338

Primary Examiner—James W. Lawrence
Assistant Examiner—Davis L. Willis
Attorney, Agent, or Firm—Cain and Lobo

[57] ABSTRACT

A power meter for measuring radiation is disclosed, which includes: a partially transmitting body able to absorb some fraction of radiation incident on the body and to re-emit absorbed energy; and, pyrometric means lying outside the path of incident radiation, for measuring radiation emitted by the body. The amount of emitted radiation is proportional to the intensity of incident radiation. The characteristics of a beam of ultraviolet, visible or infrared radiation are substantially unaffected by transmission through the body, thus permitting use of the beam while it is either continuously or discontinuously monitored.

9 Claims, 3 Drawing Figures

TRANSMITTING POWER METER FOR MEASUREMENT OF RADIATION

BACKGROUND OF THE INVENTION

Numerous methods are available for measuring the intensity of ultraviolet, visible and infrared radiation. Measurements in this art are generally made using a total energy absorbing device of one type or another, such as, for example, calorimeters. Since a total energy absorbing device functions by absorbing as much as possible of incident energy, it is, by definition, considered a non-transmitting mass of material. In contrast, the power meter of this invention utilizes a partially transmitting mass of material. Few of these prior art devices for measuring intensity of radiation can measure a wide range of intensities. A total energy absorbing device is also incapable of continuously measuring intensity of radiation which may then be used for other purposes as needed. In other words, intensity of radiation is measured with a calorimeter intermittently, on occasions when the radiation is to be monitored for intensity, and, during a period when the radiation is taken out of use.

The term "radiation" as used in this specification refers to ultraviolet radiation in excess of about 400A (Angstrom) extending into the visible and then the infrared region, up to about $500\mu$, (microns). The phrase "total energy absorbing device" refers to an ideal absorber which is theoretically desirable, but from a practical point of view, can only be approached very closely. Conventional calorimeters are theoretically total energy absorbing devices in which the primary energy source to be measured is absorbed in a material which is not partially transmitting in the manner it is used.

In many instances, it is desirable not only to know the intensity of the beam to be used, but to know its intensity while it is being used. For example, where a laser beam is used in the garment industry for cutting patterns from plural layers of fabric, or in the lumber industry where a laser beam is used to cut sheets of plywood and other material, too intense a beam will deleteriously affect the material being cut, and a beam of insufficient intensity will not make a clean cut.

Particularly where it is desired to measure the intensity of high energy beams such as industrial laser beams, referred to hereinabove, irrespective of the wavelength of radiation, the common method of measurement utilizes a calorimeter. In this calorimetric method, the radiant energy is absorbed, as completely as possible, in a body of material and the temperature rise produced is measured by conventional temperature sensing means. Despite due precautions there are inherent errors which must be estimated, preferably by calibration against a beam of known intensity. One such error is that due to leakage, termed "leakage error," because some of the energy absorbed by the body is lost while its temperature is increasing and before a temperature measurement is made. An attempt to solve the problem of accounting for leakage error is disclosed in U.S. Pat. No. 3,459,945 wherein a pyroelectric material is used as a calorimeter which is electroded on both the inside and outside.

The intensity of a radiant beam may also be measured with a photodetector which produces an electrical output that can be measured accurately. Since the electrical output is directly correlatable to the intensity of radiation this method would appear to be of particular value. However, accuracy of measurement requires very high frequency response of the photodetector and its associated circuitry, and high intensity radiation cannot be measured directly because of the limitations of photo-conductive materials. Moreover, photodetectors have limited range and are useful only at relatively low power levels.

Still another method for measuring the intensity of radiation utilizes a thermopile pyrometer as disclosed in U.S. Pat. No. 3,496,514. Though the device may be used to make relatively more rapid measurements than with a conventional calorimetric device, it will be evident that there are numerous inherent problems of accuracy. Moreover, such a device is capable of measuring only a relatively narrow range of intensities.

Still other methods use beam splitters and partially transmitting mirrors which absorb a predetermined portion of the incident beam in a total-energy absorbing device. One way or another all prior art devices directly utilize incident radiation as a primary source of energy for the purpose of measuring its intensity. In contrast, the power meter of this invention utilizes a secondary source of energy, namely re-emitted energy, to accomplish this purpose more accurately and with greater flexibility.

Heretofore, a partially transmitting material has not been used in a power meter even though it is known that a temperature increase is proportional to the amount of radiation absorbed by such a material. In the prior art, the effect of temperature variations on the output of a light-responsive element has sometimes been a serious problem which has been overcome by utilizing meters which are relatively insensitive to temperature variations. This has usually been done with complicated temperature compensating networks or environmental temperature control, particularly where high light intensities are to be measured.

A self-compensated light meter which is relatively insensitive to temperature, and utilizes a silicon solar cell, is described in U.S. Pat. No. 3,024,695. It is therefore, especially notable that measurement of a temperature increase in a partially transmitting material is the key which provides an unexpectedly simple but effective power meter, which may be used without interfering substantially with the radiation being measured.

There is presently no device for measuring a relatively wide range of intensities of radiation utilizing a partially transmitting mass of material in a device which is simple, easy to use and, above all, accurate. Moreover, no known device is capable of measuring the intensity of a high energy beam, such as a powerful industrial laser beam, by permitting essentially the entire beam to be transmitted through a relatively high-transmittance material, and, sensing the temperature increase within the material by a remote sensing means.

SUMMARY OF THE INVENTION

It has been discovered that certain optical bodies having relatively high transmittance may be used to intercept radiation so as to generate a measurable thermal signal within the body.

More particularly, it has been discovered that certain inorganic crystals which have relatively high transmittance to radiation in the wavelength range from about 400A to about $500\mu$ may be used to intercept the radiation and generate a measurable thermal signal essentially instantly. The signal may be measured by any sensing means such as a pyroelectric detector or sensitive thermopile.

It is therefore a general object of the invention to provide a simple and easy to use radiation power meter, which is accurate and versatile, and which operates without absorbing the total energy of the incident beam.

It is another general object of this invention to provide a transmitting power meter for quantifying, with predetermined precision, the intensity of radiant energy by intercepting the radiant energy with a body having a preselected absorption coefficient generally substantially less than unity, and measuring the increase in temperature within the body, by means of a suitable sensing means.

It is still another general object of this invention to provide a transmitting power meter capable of measuring a wide range of intensities and wavelengths of ultraviolet, visible and infrared radiation by intercepting the radiation, continuously or discontinuously, without adversely affecting the primary utilization of the radiation.

It is a specific object of this invention to provide a partially transmitting inorganic crystal having a preselected coefficient of absorption and a thermally responsive pyroelectric detector means with associated electrical circuitry responsive to a thermal signal generated within the crystal.

It is another specific object of this invention to provide a partially transmitting power meter which may be used as an on-line instrument without changing the characteristics of the beam being monitored.

It is still another specific object of this invention to provide a transmitting power meter which can measure the intensity of a radiant beam of one or more wavelengths substantially instantaneously, and with any desired accuracy, by sensing heat energy of another wavelength within a mass of material having preselected absorptivity to the beam without interfering substantially with the use of the beam.

It is yet another specific object of this invention to provide a transmitting power meter which utilizes a relatively high transmittance optical body having an absorption coefficient of less than about 0.5 cm$^{-1}$, and preferably less than about 0.01 cm$^{-1}$, to intercept primary energy of a laser beam so as to generate a source of secondary heat energy within the optical body; the heat energy is sensed by a pyroelectric detector.

It is also a specific object of this invention to provide a power meter for continuously measuring the power of an operating laser beam such as is used for cutting fabric, lumber products, ceramics, and the like, by intercepting the beam but without substantially diminishing its transmitted power and without noticeably altering the characteristics of the beam.

These and other objects, features and advantages of this invention will become apparent to those skilled in the art from the following description of a preferred form thereof reference being had to accompanying drawing and appended claims.

Figure 1:
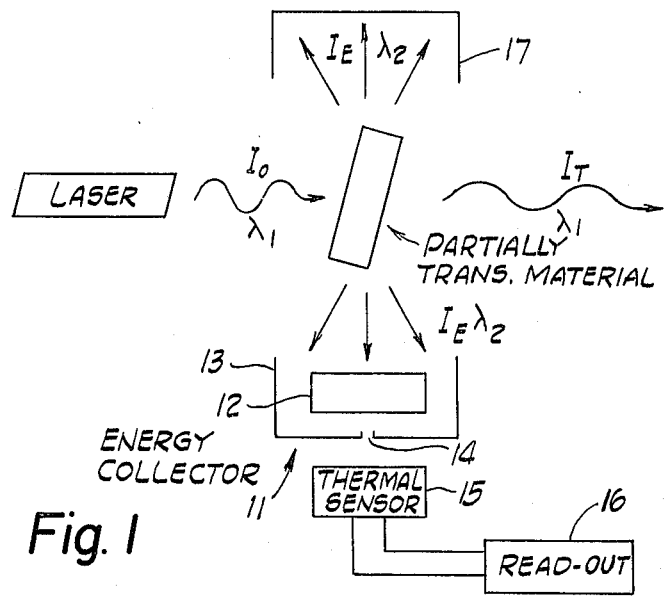
FIG. 1 is a diagrammatic illustration of the transmitting power meter of this invention.

For the sake of clarity and immediate comprehension, symbols in the drawing are descriptively identified directly, in addition to conventional numerals which are then referred to in the detailed description.

DETAILED DESCRIPTION OF PREFERRED EMBODIMENTS

According to this invention a transmitting power meter includes a partially transmitting mass of material which absorbs only a portion of the radiation intercepted by it, and releases absorbed energy so that at least a portion thereof falls on a thermal sensor for released energy, which thermal sensor lies outside the path of the radiation. Where, for example, the thermal sensor is a pyroelectric detector means, a current is generated which may be suitably amplified and measured.

For the purposes of the disclosure in the specification describing this invention the term "thermal sensor" is used to specify any means capable of sensing a thermal signal originating within the partially transmitting mass of material. A pyroelectric detector means is generally preferred since it may be tailored for any particular type of measurement, and especially for those situations where only a very slight temperature rise occurs. Where the temperature rise is relatively large, a sensitive thermopile, bolometer or photodetector may provide acceptable measurements.

By the phrase "partially transmitting mass of material", we refer generally to a material which is not a total energy absorber. More specifically we refer to a material of sufficient transparency to the radiation to be measured so as not to substantially diminish its transmitted power or interfere with the characteristics of the radiation, such as its mode pattern. Preferred materials have high transmittance and low coefficients of absorption, i.e. they are relatively transparent. By coefficient of absorption we refer to the percent of radiation absorbed per unit thickness of transmitting material. For example, a material which transmits 90 percent of the incident radiation per centimeter of material in the path, is said to have an absorption coefficient of 0.1 per cm.

The choice of material for the partially transmitting material is not critical in the sense that a usable power meter may be fabricated from any material with an absorption coefficient substantially less than 1 cm$^{-1}$. It will be apparent to those skilled in the art that relatively high intensity beams will preferably be measured using a material with an absorption coefficient less than about 0.5 cm$^{-1}$, and more preferably less than about 0.01 cm$^{-1}$. Since other methods are available for measuring low energy radiation, the power meter of this invention will generally be used for high energy beams, though it is not limited to such usage. For example, this power meter may be used with a low energy beam which is desired to be left uninterrupted.

The choice of thickness of material depends on the absorption coefficient of the material, the intensity of the beam to be measured, the transmitted energy requirements for the beam, and the sensitivity, and field of view of the pyroelectric detector used. It will be apparent that very thin sections of relatively absorptive material will be inconvenient or difficult to use, as are very thick sections of highly transmitting material. In general, a relatively high — transmittance material has greatest versatility.

Preferred partially transmitting materials are those used for optical bodies, and more preferred are materials which are essentially transparent to the wavelength of radiation, the intensity of which is to be measured. Such materials are the inorganic ionic crystalline salts represented by the general formula:

$$M_m X_n$$

wherein M represents a metal of Groups I, II, III, IV, V, VI, VII and VIII; X represents an axion; $m$ is an integer ranging from 1 to 6 inclusive; and $n$ is an integer ranging from 1 to 6 inclusive. Most preferred materials are the halides of the alkali metals and the alkaline earth metals. Also useful are glasses and similar vitreous materials, and certain organic materials which have requisite transmittance. It is not essential that the material be solid. A suitable liquid or gaseous material may be used if it is contained in a material having a desirable coefficient of absorption. Particular organic materials which may be used are stilbene and anthracene.

As has been stated hereinbefore, the choice of partially transmitting material is not critical, but a good choice depends upon the wavelength of radiation, the power level of the radiation, and, the accuracy with which a measurement of power is to be made. For example, where a beam of relatively low power, less than a watt, is to be measured, and a diminution of transmitted beam power is inconsequential, the material chosen may have a relatively high absorbance, and the heat sensing means may be a relatively insensitive pyroelectric detector means. Not unexpectedly, the accuracy of such a measurement is not very high. Alternatively, a material with relatively low coefficient of absorption may be used with a relatively sensitive pyroelectric detection means to get high accuracy and minimum decrease of transmitted beam intensity. The same considerations apply for high intensity radiation, essentially irrespective of its wavelength. The thrust of the invention is the utilization of a suitable relatively high-transmittance material and a pyroelectric detector means to conspire to measure a sudden temperature increase in the material, quickly and accurately, without substantially diminishing the intensity of the radiation.

In a particular example, wherein a $CO_2$ laser beam having an intensity in the range from about 10 to about 100 watts is to be measured, a parallelepiped, single crystal, partial absorber of pure potassium chloride (KCl) having an absorption coefficient of less than 0.001 cm$^{-1}$ is used. The crystal is positioned to intercept the laser at one face as shown in FIG. 1, and the laser beam is transmitted by the crystal, emerging from the opposite face. A pyroelectric detector is positioned such that it has a view of the laser beam as it passes through the absorber but such that it is not in the path of the laser beam. The sensor typically incorporates a strontium barium niobate detector with associated electric circuitry to provide both a meter analog and various other displays. The method of intercepting the laser beam, or the duration of the period during which the laser passes through the crystal is not critical as long as a thermal signal is generated within the crystal correlatably responsive to the intensity of the laser beam, and this signal is sensed by a pyrometric detection means of adequate sensitivity.

Any sufficiently sensitive pyrometric means may be used to measure the thermal signal or temperature rise within the crystal. It is hypothesized that primarily that portion of the crystal directly in the path of the laser rises in temperature, or generates a sensible thermal signal, and such a signal or rise in temperature is generally so small as to require a relatively sensitive pyrometric means such as a pyroelectric detector. In instances where the temperature rise is relatively high, a sensitive thermopile may be used.

Where, in another example, a higher energy beam of one or more wavelengths in excess of 100 watts of energy is to be measured, a partial absorber of pure crystalline KCl having an absorption coefficient of less than 0.0005 cm$^{-1}$ is used, so as to allow maximum transmitted beam intensity. In general, where such a higher energy laser is used, it is desirable to sacrifice as little of its energy as possible, and, at the same time maintain the mode pattern of the beam. The power meter of this invention is used as an on-line instrument utilizing a remote pyroelectric detector to sense the heat energy having a different wavelength from that of the high energy beam. It will be understood that the positioning of the heat sensing means is a matter of choice depending upon various factors which affect the quality of the measurement to be made. A remote pyroelectric detector disposed in spaced apart relationship from the partial absorber material of this device minimizes the errors of measurement.

Referring now more particularly to FIG. 1, there is illustrated, symbolically, a typical coaction of the various elements of the power meter of this invention as they conspire to measure the intensity $I_o$ of an incident laser beam having a wavelength $\lambda_1$. The laser beam is intercepted by a partially transmitting mass of material of preselected thickness, which is preferably coated with an antireflective coating, and placed at a suitable angle to the incident laser beam. A preferred material is that used for making optical bodies, such as for example, a crystalline ionic solid. A portion of the primary energy of the laser beam is transmitted through the material and emerges as a transmitted beam of the same wavelength $\lambda_1$ and transmitted intensity $I_T$. Another portion of the primary energy of the incident laser beam is absorbed by the material and produces a thermal signal evidenced by an increase in temperature. Absorbed energy in the material is re-emitted as secondary energy with a wavelength region $\lambda_2$, different from the incident wavelength $\lambda_1$, with an intensity $I_E$. It is possible that one or more of wavelengths in the wavelength region $\lambda_2$ may, by coincidence, be the same as wavelength $\lambda_1$, but it is not likely. Also, where for example, the incident beam includes radiation of plural wavelengths, the re-emitted energy may be the same as one of the plural wavelengths, again by the chance of particular circumstances.

A portion of the re-emitted secondary energy $I_E$, $\lambda_2$ is collected by a suitable collection means or energy collector indicated generally at 11. Typically, the energy collector 11 may include collecting lenses 12 surrounded by shield 13. An aperture 14 is provided in the shield 13. Energy collected by the energy collector emerges from the aperture 14 and may impinge upon any suitable thermal sensor 15, preferably a pyroelectric detector. For measurement of a continuous wave laser beam, a segmented disc or chopper is used, such as is generally used for this purpose. A chopper may be dispensed with when the energy of a pulsed laser beam is to be measured. Associated electrical circuitry is provided in the read-out means indicated generally at 16.

The portion of re-emitted secondary energy chosen to be incident on the thermal sensor 15, is controlled by providing adequate control means, such as an absorber shield 17, to absorb unwanted energy.

It will be recognized that secondary energy collected by the lenses 12 and transmitted through aperture 14 may also be measured with a thermopile, bolometer or photodetector means. Alternatively, lenses 12 may be replaced with a total energy absorber, such as a sensitive calorimetric device (not shown), and the rise in temperature recorded, for a relatively imprecise determination of power as compared with using a pyroelectric detector. Such a substitution is possible when the level of secondary energy emitted by the transmitting material is relatively high.

In theory, where the temperature rise is sufficient, a thermocouple might be used directly on the transmitting material without interfering substantially with the transmission of the laser beam. This method of placing a thermocouple in contact with a totally or partially absorbing mass is an essentially calorimetric method. It determines the incident power relative to the rate of change of the crystal temperature with time. To make such a measurement quickly and accurately requires compensation mechanisms and associated electronics so complex as to negate the simplicity of this invention.

Figure 2:
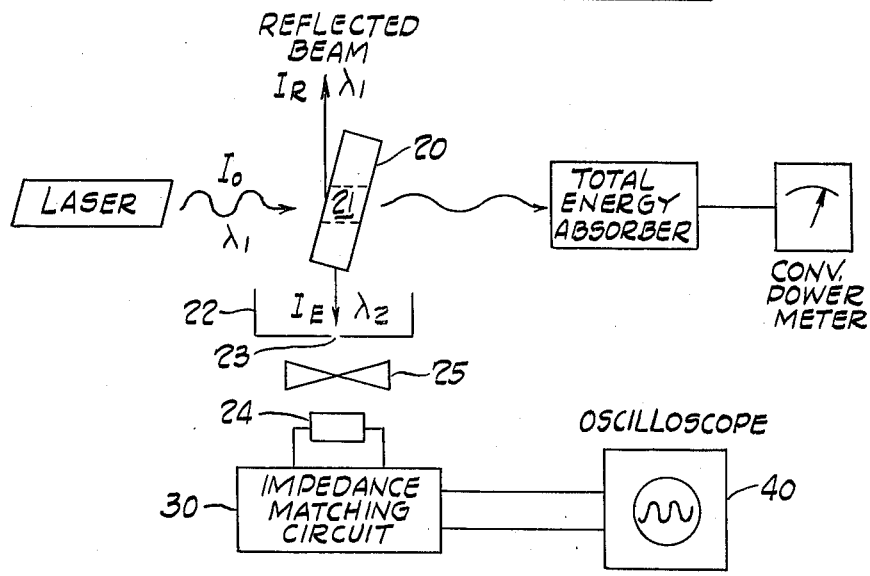
FIG. 2 is a diagrammatic illustration of a simple experiment for checking the measurement with a power meter of this invention against conventional measuring devices.
Figure 3:
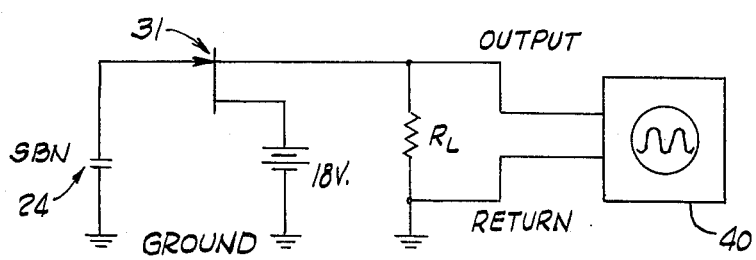
FIG. 3 is a schematic for a simple circuit which may be used in the power meter of this invention.

Referring now to FIGS. 2 and 3, there is represented, symbolically, a particular simplified experiment to demonstrate the invention by measuring the energy of a relatively powerful, continuous wave carbon dioxide laser beam at power levels from about 25 watts to about 100 watts. As before, the laser beam is directed upon a high transmittance crystalline material 20, such as a single crystal alkali metal halide or alkaline earth metal halide, preferably pure potassium chloride, having a thickness of about 1 cm. and tilted at a suitable angle. A small portion of the incident laser beam may be reflected as a beam $I_R$, $\lambda_1$. The material directly in the path of the laser beam $I_o$, $\lambda_1$ is indicated in phantom outline as a "hot column," 21 in FIG. 2. The cross-sectional area of the column 21 corresponds to that of the laser beam. The hot column is so termed because it generates a sensible thermal signal essentially instantaneously, due to absorption of a portion of the primary energy of the laser beam. Where the absorption coefficient of pure KCl is less than 0.001 cm$^{-1}$ it will be apparent that less than one-tenth of one percent of the power of the incident beam is absorbed, and the rise time for the crystal, i.e. the time required for the crystal to re-emit a satisfactory level of secondary energy $I_E$, $\lambda_2$, is directly related to the rise time of the incident radiation.

A shield 22 is provided with an aperture 23 so that the hot column 21 is in the field of view of a pyroelectric crystal detector 24. A chopper 25 has an opening which exposes the pyroelectric detector, when it rotates in front of it, to the secondary energy re-emitted by the KCl crystal 20. A frequency of 1 Hz is used. The pyroelectric crystal detector 24 is conventionally electroded and the current from the detector is conducted by an impedence matching circuit shown generally at 30, to an oscilloscope or other display means.

The transmitted portion of the beam $I_T$, $\lambda_1$ may be directed into a total energy absorber, such as a conventional calorimetric power meter, such as for example, that described in U.S. Pat. No. 3,596,514.

A typical, simple impedance matching circuit is schematically illustrated in FIG. 3. The crystal pyroelectric detector 24 may be any suitable material such as strontium barium niobate. A field effect transistor (2N3819) indicated at 31 is used as illustrated. The peak to peak response on the oscilloscope 40 is measured at power levels of 25W, 50W and 75W giving readings of approximately 20 mV$_{pp}$, 40 mV$_{pp}$ and 60 mV$_{pp}$ reply. The transmitted power of the beam as measured with the transmitting power meter of this invention correlates closely to measurements obtained with the conventional calorimetric power meter.

Those skilled in the art will appreciate that the power meter of this invention, when used as described hereinabove, will continue to read the temperature of the hot column even after the laser beam $I_o$, $\lambda_1$ is shut off. In other words, an instant indication of the shut off of the laser beam cannot be obtained. Where such instant indication of shut off is desired, the reflected beam $I_R$, $\lambda_1$ may be monitored with a thermal sensor, such as for example, a pyroelectric detector, thermopile, bolometer or the like. The choice of the thermal sensor will depend upon the power of the reflected beam and other factors which can be readily appreciated by those skilled in the art.

As stated hereinabove, this device is capable of directly monitoring instantaneous variations in the incident energy level of the entire beam. It may also be used to measure one or more particular wavelengths in a beam by filtering the beam with appropriate filters, or, to measure a portion of the incident beam which has been split.

If desired, for a particular application, the reflected beam or a portion of the reflected beam, may be recombined with the transmitted beam, through the use of suitable optical methods. A typical application may be when the maximum transmitted energy is desired. Choice of the transmitting material will depend on the particular requirements of the measurement to be made, and may include coating the material with a broad-band coating, a selective coating, or, in certain instances, an electromagnetic coating.

Modifications, changes and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

We claim:

1. A transmitting power meter for measuring the energy level of radiant energy comprising in combination, a partially transmitting crystalline mass of material having a preselected coefficient of absorption sufficient to generate a sensible thermal signal within said crystalline mass with the wavelength of radiation to be measured, and, responsively disposed in spaced apart relationship therewith, a thermal sensor for sensing and measuring said thermal signal generated within said crystalline mass when said radiant energy is intercepted by said crystalline mass.

2. A transmitting power meter for measuring the intensity of a beam of radiant energy comprising a relatively high transmittance crystalline material, having a coefficient of absorption less than about 0.5 per cm. for the wavelength of radiation to be intercepted, and sufficient thickness to generate a measurable thermal signal within said crystalline material, and, pyroelectric detector means, including associated electrical circuitry, temperature-responsively disposed in spaced apart relationship with said crystalline material, to measure said temperature increase.

3. The transmitting power meter of claim 2 wherein said coefficient of absorption is less than 0.1 per cm.

4. The transmitting power meter of claim 2 wherein said relatively high transmittance crystalline material is a crystalline ionic solid.

5. The transmitting power meter of claim 2 wherein said wavelength is in the range from about 400 A to about 15 microns.

6. The transmitting power meter of claim 4 wherein said crystalline ionic solid is selected from the group consisting of the alkaline earth metal halides and alkali metal halides.

7. A transmitting power meter for measuring the intensity of a beam of radiant energy of a first wavelength comprising a relatively high transmittance crystalline material having an absorbance for said first wavelength less than about 1 percent per cm. thickness of said material in the direction of said beam, and sufficient thickness to generate a thermal signal in said material sufficient to emit energy of a second wavelength, and, pyroelectric detector means, including associated electrical circuitry, temperature-responsively disposed in spaced apart relationship with said material, to measure said energy of said second wavelength.

8. A method for measuring the energy of a beam of radiant energy comprising continuously intercepting said beam with a partially transmitting mass of crystalline material having a coefficient of absorption substantially less than 1 per cm., said mass having a thickness sufficient to permit a temperature increase within said mass, measuring said temperature increase with a thermal sensor responsively disposed in spaced apart relationship therewith, and correlating said temperature increase with the power of said beam.

9. The method of claim 8 wherein said partially transmitting crystalline material has a coefficient of absorption of less than 0.005 $cm^{-1}$, and said thickness is insufficient to substantially interfere with the transmission of said beam.

* * * * *